Patented June 14, 1938

2,120,935

UNITED STATES PATENT OFFICE 2,120,935

PLASTIC COMPOSITIONS AND PROCESS OF SHAPING THE SAME

Frazier Groff, Lakewood, Ohio, assignor to Carbide and Carbon Chemicals Corporation, a corporation of New York No Drawing. Application August 29, 1936, Serial No. 98,579

15 Claims. (Cl. 106—22)

The production of shaped articles from plastic compositions containing artificial resins is commonly effected through the action of pressure or heat or both. These operations may depend on the use of molds or matrices to form the articles, or may involve more or less continuous procedures, such as calendering or extrusion. Many artificial resins, and plastic compositions containing them, are susceptible to deterioration by heat, due probably to lack of complete chemical stability. This deterioration usually is evidenced by discoloration of the material. Certain compositions also may possess physical properties which hamper their formation into shaped articles. For example, it is difficult to produce smooth surfaces on articles made of compositions which tend to adhere to the forming equipment, and it is difficult to produce articles of such compositions free from entrapped air, or other gases. These factors necessarily limit the use of heat and pressure in forming many plastic compositions to closely controlled operations, and preclude the use of some shaping procedures which otherwise might advantageously be employed.

This invention is concerned with the production of shaped articles from plasticized partial polyvinyl acetal resin compositions, and the principal objects of the invention are to provide a simple and efficient method of shaping these compositions by heat and pressure, and novel compositions of the class described which are capable of being readily formed by heat and pressure to produce shaped articles free from chemical deterioration and physical defects.

The plastic compositions with which this invention deals are composed essentially of partial polyvinyl acetal resins uniformly colloided with ester plasticizers to form clear and homogeneous masses. Partial polyvinyl acetal resins are not soluble in ester plasticizers at ordinary temperatures, but these resins themselves have the property of dissolving sufficient quantities of ester plasticizers to yield adequately softened compositions. These compositions are characterized by remarkable qualities of elasticity and resilience coupled with great strength and toughness. In appearance, they are clear and colorless, or nearly so, and the combination of the resin with the plasticizer is so nearly permanent as to render them extremely valuable where lasting qualities of strength and elasticity over a wide range of temperatures are desired. A typical application of these plastic compositions is in the formation of laminated nonshattering glass wherein a colorless reinforcing plastic material having high strength, good adhesion, extreme clarity and permanent resiliency is of greatest importance. This invention is especially suited for providing sheeted forms of these plastic compositions for use in making nonshattering glass, since sheet materials for this purpose must not suffer discoloration in the forming operations, and must be free from bubbles of entrapped air as well as surface irregularities.

The objects of this invention can be attained, and shaped articles can be easily and economically produced from plasticized partial polyvinyl acetal resin compositions, by dispersing small but significant quantities of water uniformly throughout the compositions, and shaping the resulting mass by means of heat and pressure. I have found by test that the presence of water in the composition is virtually essential to the formation of shaped articles from the plastic compositions described whenever continuous forming operations are employed, and that the shaping of the composition, particularly into sheet form, proceeds more efficiently in this manner than is possible with the use of previously employed expedients.

The presence of small quantities of water in the composition during the forming operations precludes the development of color in the material, insures the absence of air bubbles in the articles produced, and prevents surface roughness and irregularities by apparently eliminating temporarily the tendency of the composition to adhere to surfaces with which it is in contact. At the same time, the water used is completely eliminated, or virtually so, and bubbles or other irregularities are not developed in the articles produced if they are subsequently heated to temperatures at which water would be volatilized.

The amount of water necessary in the practice of this invention may vary, and, in general, from 1% to about 15% by weight of the composition is required. If the compositions are to be shaped by calendering operations, at least 5% of water should be present, and I prefer to use from about 6% to about 10%. In extrusion operations, less than 5% of water is required, and from 1% to 2% is sufficient.

Partial polyvinyl acetal resins are those such as may be formed by the condensation of aldehydes with some but not all of the hydroxyl groups of polyvinyl alcohol, and which contain in the polymeric aggregate both acetal groups and free alcoholic hydroxyl groups. The degree to which the hydroxyl groups of the polyvinyl alcohol macromolecule have been combined with aldehyde may be indicated as percent (%) acetalization. Various methods have been proposed for making partial polyvinyl acetal resins, and for colloiding these resins with ester plasticizers to form the plastic compositions with which this invention is concerned. In general, the present invention is applicable to these compositions however they are produced.

My invention is not applicable to compositions containing polyvinyl acetal resins which are completely acetalized, or nearly so, and it may not be applied with best results to compositions formed from all partial polyvinyl acetal resins. Those resins which yield compositions best adapted for use in this invention are prepared from polyvinyl alcohol (or other polyvinyl compounds) of a molecular weight in excess of about 10,000, and those compositions based on resins which have their origin in polyvinyl acetate having an average molecular weight of at least 25,000 are preferred. (Molecular weights referred to herein are calculated by means of Staudinger's formula from viscosity determinations on solutions of the materials.) The suitability of a given resin of this type is determined by two additional factors, the more important of which is the degree of acetalization, and of nearly equal importance is the nature of the aldehyde from which it is made. In general, compositions useful in the practice of this invention contain resins which are acetalized between about 35% and about 90%, and which are made from aldehydes of the aliphatic series containing from two to six carbon atoms. Preferably, the aldehyde is saturated and straight-chained in structure, and butyraldehyde, propionaldehyde, and valeraldehyde are specifically preferred in the order given. The optimum degrees of acetalization which have been determined for resins yielding plastic compositions for use in this invention are from about 88% to 94% with acetaldehyde; from about 62% to 88% with proprionaldehyde; from about 54% to 78% with butyraldehyde; and from about 39% to 58% with valeraldehyde.

The partial polyvinyl acetal resins just described are soluble in the lower aliphatic alcohols, glycol ethers, and in water-soluble organic liquids generally, but they are not soluble in water, nor in water-insoluble organic solvents including the ester plasticizers and the more volatile esters, such as ethyl and butyl acetates; the ketones, including acetone; aliphatic or aromatic hydrocarbons and chlorinated hydrocarbons, such as hexane, benzene, toluene, chlorbenzene, chloroform and methylene chloride. These solubility characteristics refer to ordinary temperatures, and at increased temperatures the solubility of these resins in such liquids as the esters becomes greater. In no case, however, are the resins soluble in water.

The ester plasticizers with which the partial polyvinyl acetal resins may be colloided to form the compositions with which this invention is concerned are, in general, those which are water-insoluble, and these may include phthalates of the glycols and glycol ethers, and of the lower alcohols. The corresponding esters of tartaric, succinic, and related acids also may be used, and the hexoic acid esters of the polyethylene glycols are specifically preferred for making compositions for use in this invention. Examples of suitable plasticizers are diethyl and dibutyl phthalates, dibutyl tartrate, dichlorethyl phthalate, di(beta-butoxyethyl) phthalate, and the dihexoates of di-, tri-, tetra-, and pentaethylene glycols. The hexoates may be esters of the normal acid or its isomers, such as 2-ethyl butyric and 2-methyl pentoic acids, and dihexoates of diethylene and triethylene glycols are preferred. The amount of plasticizer may vary greatly, and may be as great as 60%, or more, by weight of the total. For many purposes, particularly in making nonshattering glass, compositions of the partial polyvinyl acetal resins in which the ester plasticizer constitutes from about 25% to about 50% of the whole are desirable, and those compositions containing about 30% by weight of plasticizer are specifically desirable for this purpose.

A number of methods have been proposed by means of which the partial polyvinyl acetal resins may be colloided with ester plasticizers. In my copending application, Serial No. 88,404, filed July 1, 1936, there is shown a process for achieving this end which employs water, and because of the nature of the present invention, plastic compositions made by that process are especially suited for the practice of this invention. Briefly, the process of application, Serial No. 88,404 comprises colloiding the resin with the ester plasticizer in the presence of water in quantity sufficient to wet and swell the resin. This quantity may vary from about 20% to 200% by weight of the resin used. Preferably, the plasticizer is added to the resin and water which have been previously mixed. Part of the water is displaced by the plasticizer, and mixing is continued at moderately elevated temperatures. Water is volatilized during this continued mixing, and finally the mass becomes clear and homogeneous and contains but traces of water. Because of processes by which partial polyvinyl acetal resins are commonly made, this method of colloiding the resins with plasticizers is unusually desirable, and because water is employed in this invention, the advantages, economy and desirability of the water compounding process are multiplied.

The most usual methods employed for the preparation of partial polyvinyl acetal resins result in the formation of a solution of the resin. It is customary to recover the resin from the solution, and to prepare it in dry form, by precipitating it through the addition of water to the solution. The precipitated resin is a heavy, dough-like mass, which may be separated from the bulk of the precipitant (water) and solvent by decantation. The resin may be redissolved and filtered, or otherwise treated as is desired, but the final operation, in any case, involves drying it to separate it from the water used in the precipitating operation. The wet resin as discharged from the process, but before it has been dried, may be conveniently compounded with plasticizers by means of the process described in my copending application. For this purpose, the resin preferably is taken from the process at a stage where it is in admixture with about an equal weight of water.

For purposes of forming shaped articles by means of the present invention, the plastic composition may be formed as described above by compounding the wet resin with the desired quantity of plasticizer, and the final elimination of water can be stopped short of completion to yield a composition containing less than 15% by weight of water. This composition, comprising the colloided mass of partial polyvinyl acetal resin and plasticizer containing the water dispersed uniformly throughout the mass, is exceptionally desirable in the shaping operations. It may be placed on a differential roll mill at a moderate temperature, and after one or two passes through the mill, it can be charged directly to a calender, and formed into sheets of the desired thickness. If it is desired to form shaped articles from the composition by extrusion, the water content may be reduced to around 1% or 2%, and the composition charged to a hydraulic extrusion machine, and forced by heat and pressure through a die of the desired shape to form sheets, ribbons, rods, tubes, or other shaped articles. Continuous screw-thread extrusion devices also may be used for this purpose. Water is gradually eliminated throughout the course of these operations, and the finished articles have little or no water content. A brief conditioning period during which the final products are held at about 60° C. will serve to expel the water completely.

The following specific examples will serve to illustrate the invention in several of its embodiments:

Example 1

A partial polyvinyl acetal resin prepared from polyvinyl acetate having an average macromolecular weight of about 27,000 and which was about 67% acetalized with butyraldehyde was colloided with triethylene glycol di(2-ethyl butyrate) in the proportions of 69 parts by weight of the resin and 31 parts of the ester. The colloiding operation was carried out in the presence of about 70 parts of water with which the resin had been saturated in the final precipitation stage of the process by which it was made. Mixing in a dough-type mixer was continued, allowing the water to evaporate, until the mass was completely homogeneous, and the temperature of the batch was still below 110° C. At this stage evaporation of the water was checked by partially sealing the mixer, and the water content of the batch adjusted to approximately 8% by addition of distilled water. The batch was then cooled to a temperature of about 90° to 100° C. and charged to a two roll mill, having a roll temperature of approximately 40° C. After a double pass through this mill, a thick sheet of plastic at a temperature of about 90° C. was charged to the calender with a roll temperature of 71° C. Sheets 0.010 inch and 0.015 inch thick were formed by a single pass through two, almost equal speed, rolls. These sheets were clear, transparent and bubble-free and had smooth surfaces with an overall variation in thickness of 0.003 inch. As the sheets were removed from the calender, they were dusted with powder, such as sodium bicarbonate, to prevent sticking when folded or formed into a roll. Prior to laminating into non-shatterable glass, the powder was then removed by washing, and the sheet material dried for a short time at about 60° C. to remove the very small amount of residual water.

Example 2

A dry and finely divided partial polyvinyl acetal resin which was about 67% acetalized with butyraldehyde was colloided with triethylene glycol di(2-ethyl butyrate) in the proportions of 69 parts by weight of the resin and 31 parts of the ester. In this instance a dry compounding process was used, i. e. an intimate mixing of the plasticizer and resin was effected without the aid or presence of water. The plasticized mass was then charged to a dough-type mixer, and distilled water added with continued hot mixing until the batch was thoroughly homogeneous, and the water content was from 5% to 12%. The plastic mass was then cooled and processed into sheet material in the same manner as described in Example 1. Bubble-free sheets of similar smooth surface characteristics, excellently adapted, after drying, for glass lamination, were obtained.

Example 3

A plastic of the same composition as Example 1 was made, and colloided with plasticizer in a similar manner, with the exception that the water content of the mass in the mixer was controlled to within 1% to 2%. With this water content the plastic was then charged to a batch-type hydraulic extrusion machine. Maintaining a cylinder temperature of 100° to 135° C., and a die temperature of approximately 145° C., the resin was extruded into sheet form, with immediate cooling by immersion in cold water. Uniform, smooth and bubble-free sheets were also obtained in this manner.

Example 4

Employing the same plastic composition as in Example 3, with a similar water content of 1% to 2%, a charge was made to a cold two roll mill, and a sheet formed of approximately ¾ inch in thickness which contained very little entrapped air. This sheet, at a temperature of about 100° C., was then fed to a continuous screw extrusion machine, in which the cylinder and head temperature was maintained at 40° C. to 90° C. and the die temperature from 140° C. to 165° C. The extruded plastic, both in flat sheet form and in articles of other shape, was clear and transparent and of excellent surface characteristics.

Example 5

A batch of polyvinyl acetal resin prepared and colloided in the manner of Example 1 was taken from the mixer with a water content of about 8% and a temperature of 95° C. This was divided into two portions, one of which was processed in an identical manner to the calendering procedure of Example 1, and gave smooth regular sheets of a quality admirably adapted in the laminating of non-shatterable glass. The second portion was milled on a two roll mill, having a roll temperature of 66° C., until substantially all the water therein had been volatilized. The plastic in this condition was charged to a calender and formed into sheet. The tendency of the resin to adhere to the calender rolls was very noticeable, and the sheet product had a very rough surface which was quite unsuitable for making laminated glass.

Example 6

A charge of partial polyvinyl acetal resin, again compounded and plasticized as in Example 1, was removed from the mixer with a water content of between 5% and 12%. This was stored and cooled, and the cold plastic was then charged to a two roll mill having a roll temperature of approximately 60° C. to 70° C. A strip about 3 inches wide and ½ inch thick was removed continuously from this mill, and fed to a screw extrusion machine from which rods about 3 inches in diameter were extruded. The extruded rod, discharged at a temperature of approximately 85° C., was fed directly to a calender from which a sheet form of the plastic was obtained. The sheet was bubble-free, clear and transparent, and of a very smooth surface. As a modification of the above procedure, the original mix can be charged to the two roll mill without cooling, and to facilitate handling of the plastic, the extrusion machine may be located so as to deliver the extruded stock directly to the calender.

While the above examples are representative of preferred processing conditions and the plastic compositions formed thereby, modifications will be evident within the scope of invention. There is indication that for satisfactory extrusion, either in a continuous or batch process, the water content of the plasticized resin need not be above 2%, whereas for calendering 5% to 12% gives the best results. Variation in this factor may, however, be desirable, to suit the temperature and other operating conditions of different forming procedures, the latter of which are likewise not limited to those specified in the examples.

Aside from the improved economy of procedure afforded in the shaping and forming of partial polyvinyl acetal resins in the manner of this invention, numerous advantages are inherent in the compositions so formed. The presence of water during forming of the plastic assists in the elimination of air, with improved characteristics in the final product. By its evaporation during calendering or extrusion, the water aids in controlling the temperature of the resin, and it greatly retards dehydration which might otherwise tend to occur between the alcoholic hydroxyl groups contained in the resin molecule. This permits extensive and repeated reworking of the plastic material without marked deterioration, as evidenced by coloring of the resin. The lack of tendency in the plastic containing water to adhere to parts of the shaping apparatus avoids roughened surfaces so difficult to eliminate in prior known methods of processing polyvinyl acetal resins, and the improved surface characteristics of sheets and other forms of the plastic, made in the manner of this invention, will greatly enhance the field of use of such materials.

The invention should not be limited other than as defined in the appended claims.

I claim:

1. A process of shaping a plasticized partial polyvinyl acetal resin composition, which includes the steps of preparing a composition consisting of an adherent water-insoluble partial polyvinyl acetal resin plasticized with a compatible plasticizer in which said resin is insoluble at ordinary temperatures and a quantity of water uniformly dispersed throughout said composition, and subsequently subjecting said plasticized resin to heat and pressure shaping operations in the presence of a small quantity of water dispersed throughout said composition, said small quantity of water being sufficient to eliminate temporarily the tendency of said plasticized resin to adhere to surfaces with which it is in contact, to make clear and transparent forms free from bubbles and from entrapped air.

2. A process of shaping a plasticized partial polyvinyl acetal resin composition, which includes the steps of preparing a composition consisting of an adherent water-insoluble partial polyvinyl acetal resin plasticized with a compatible plasticizer in which said resin is insoluble at ordinary temperatures and a quantity of water in the neighborhood of about 15% by weight uniformly dispersed throughout said composition, and subsequently subjecting said plasticized resin to heat and pressure shaping operations in the presence of a small quantity of water dispersed throughout said composition, said small quantity of water being sufficient to eliminate temporarily the tendency of said plasticized resin to adhere to surfaces with which it is in contact, to make clear and transparent forms free from bubbles and from entrapped air, and diminishing the amount of water in said composition.

3. A process of shaping a plasticized partial polyvinyl acetal resin composition, which includes the steps of preparing a composition consisting of an adherent water-insoluble partial polyvinyl acetal resin plasticized with a compatible plasticizer in which said resin is insoluble at ordinary temperatures and a quantity of water uniformly dispersed throughout said composition, and subsequently subjecting said plasticized resin to heat and pressure shaping operations in the presence of from about 1% to about 12% by weight of water dispersed throughout said composition to eliminate temporarily the tendency of said plasticized resin to adhere to surfaces with which it is in contact, to make clear and transparent forms free from bubbles and from entrapped air.

4. A process of shaping a plasticized partial polyvinyl acetal resin composition, which includes the steps of preparing a composition consisting of an adherent water-insoluble partial polyvinyl acetal resin plasticized with a compatible plasticizer in which said resin is insoluble at ordinary temperatures and a quantity of water uniformly dispersed throughout said composition, and subsequently subjecting said plasticized resin to a calendering operation in the presence of a small quantity of water dispersed throughout said composition, said small quantity of water being sufficient to eliminate temporarily the tendency of said plasticized resin to adhere to surfaces with which it is in contact, to make clear and transparent sheets free from bubbles and from entrapped air.

5. A process of shaping a plasticized partial polyvinyl acetal resin composition, which includes the steps of preparing a composition consisting of an adherent water-insoluble partial polyvinyl acetal resin plasticized with a compatible plasticizer in which said resin is insoluble at ordinary temperatures and a quantity of water uniformly dispersed throughout said composition, and subsequently subjecting said plasticized resin to a calendering operation in the presence of from about 5% to about 12% by weight of water dispersed throughout said composition to eliminate temporarily the tendency of said plasticized resin to adhere to surfaces with which it is in contact, to make clear and transparent forms free from bubbles and from entrapped air.

6. A process of shaping a plasticized partial polyvinyl acetal resin composition, which includes the steps of preparing a composition consisting of an adherent water-insoluble partial polyvinyl acetal resin plasticized with a compatible plasticizer in which said resin is insoluble at ordinary temperatures and a quantity of water uniformly dispersed throughout said composition, and subsequently subjecting said plasticized resin to an extrusion operation in the presence of from about 1% to about 2% by weight of water dispersed throughout said composition to eliminate temporarily the tendency of said plasticized resin to adhere to surfaces with which it is in contact, to form clear and transparent forms free from bubbles and from entrapped air.

7. A process of shaping a plasticized partial polyvinyl acetal resin composition, which includes the steps of uniformly dispersing water throughout a composition consisting of an adherent water-insoluble partial polyvinyl acetal resin acetalized from about 35% to about 90% with an aliphatic aldehyde and plasticized with a compatible plasticizer in which said resin is virtually insoluble at ordinary temperatures, thereafter diminishing the quantity of water in said plasticized resin, and subjecting the latter to heat and pressure shaping operations in the presence of a small quantity of water sufficient to eliminate temporarily the tendency of said plasticized resin to adhere to surfaces with which it is in contact to make clear and transparent forms free from bubbles and from entrapped air, said small quantity of water being from about 1% to about 15% by weight.

8. Composition adapted to produce clear and transparent forms free from entrapped air, which composition consists of an adherent water-insoluble partial polyvinyl acetal resin plasticized with a compatible plasticizer in which said resin is virtually insoluble at ordinary temperatures, throughout which plasticized resin is uniformly dispersed a small quantity of water sufficient to eliminate temporarily the tendency of said plasticized partial polyvinyl acetal resin to adhere to surfaces with which it is in contact, said small quantity of water being from about 1% to about 15% by weight.

9. Composition adapted to produce clear and transparent forms free from entrapped air, which composition consists of an adherent water-insoluble partial polyvinyl acetal resin acetalized between about 62% and about 88% with propionaldehyde and plasticized with a compatible polyethylene glycol hexoate in which said resin is virtually insoluble at ordinary temperatures, throughout which plasticized resin is uniformly dispersed a small quantity of water sufficient to eliminate temporarily the tendency of said plasticized partial polyvinyl acetal resin to adhere to surfaces with which it is in contact, said small quantity of water being from about 1% to about 15% by weight.

10. Composition adapted to produce clear and transparent forms free from entrapped air, which composition consists of an adherent water-insoluble partial polyvinyl acetal resin acetalized between about 54% and about 78% with butyraldehyde and plasticized with a compatible polyethylene glycol hexoate in which said resin is virtually insoluble at ordinary temperatures, throughout which plasticized resin is uniformly dispersed a small quantity of water sufficient to eliminate temporarily the tendency of said plasticized partial polyvinyl acetal resin to adhere to surfaces with which it is in contact, said small quantity of water being from about 1% to about 15% by weight.

11. Composition adapted to produce clear and transparent forms free from entrapped air, which composition consists of an adherent water-insoluble partial polyvinyl acetal resin acetalized between about 39% and about 58% with valeraldehyde and plasticized with a compatible polyethylene glycol hexoate in which said resin is virtually insoluble at ordinary temperatures, throughout which plasticized resin is uniformly dispersed a small quantity of water sufficient to eliminate temporarily the tendency of said plasticized partial polyvinyl acetal resin to adhere to surfaces with which it is in contact, said small quantity of water being from about 1% to about 15% by weight.

12. Composition adapted to produce clear and transparent calendered sheets substantially free from entrapped air which comprises a partial polyvinyl acetal resin acetalized between about 54% and about 78% with butyraldehyde and homogeneously compounded with triethylene glycol di (2-ethyl butyrate), and a quantity of water from about 6% to about 10% by weight intimately and uniformly dispersed therein.

13. Composition adapted to produce clear and transparent calendered sheets substantially free from entrapped air which comprises a partial polyvinyl acetal resin acetalized about 67% with butyraldehyde and homogeneously compounded with triethylene glycol di (2-ethyl butyrate), and a quantity of water from about 6% to about 10% by weight intimately and uniformly dispersed therein.

14. Composition adapted to produce clear and transparent calendered sheets substantially free from entrapped air which comprises a partial polyvinyl acetal resin acetalized about 67% with butyraldehyde and homogeneously compounded with about 31 parts by weight of triethylene glycol di (2-ethyl butyrate), and about 8% by weight of water intimately and uniformly dispersed therein.

15. Composition adapted to produce clear and transparent articles substantially free from entrapped air, which comprises a partial polyvinyl acetal resin homogeneously compounded with from about 25% to about 50% by weight of polyethylene glycol dihexoate and intimately and uniformly associated with from about 1% to about 12% by weight of water, said resin being derived from a polyvinyl body having an average molecular weight above about 10,000, and said resin containing from about 35% to about 90% of acetal groups of aliphatic aldehyde, said aldehyde and the extent of acetalization being so correlated that the resin is compatible with substantial amounts of said polyethylene glycol dihexoate while being virtually insoluble therein at ordinary temperatures.

FRAZIER GROFF.